Sept. 29, 1959      E. F. SMITH ET AL      2,906,122
LIQUID LEVEL INDICATOR SENDING UNIT
Filed Jan. 22, 1957      2 Sheets-Sheet 1
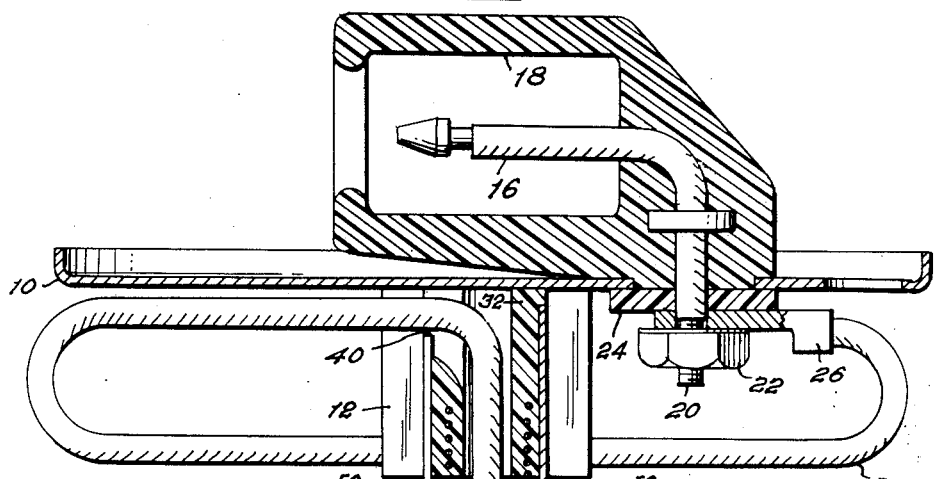
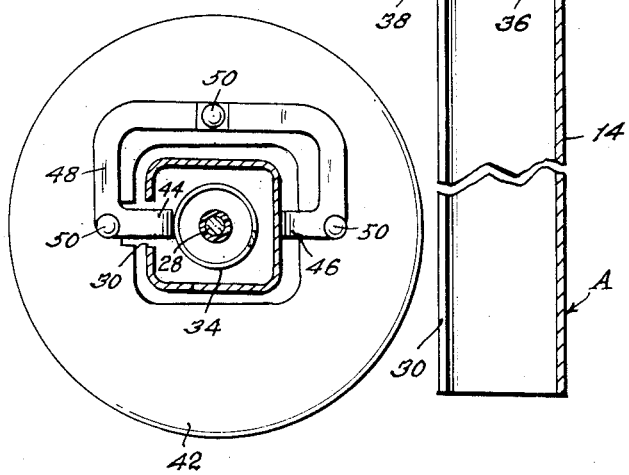
INVENTORS,
Ernest F. Smith
Achille R. Barragato
Elliott F. Oakwood
Robert H. Sage

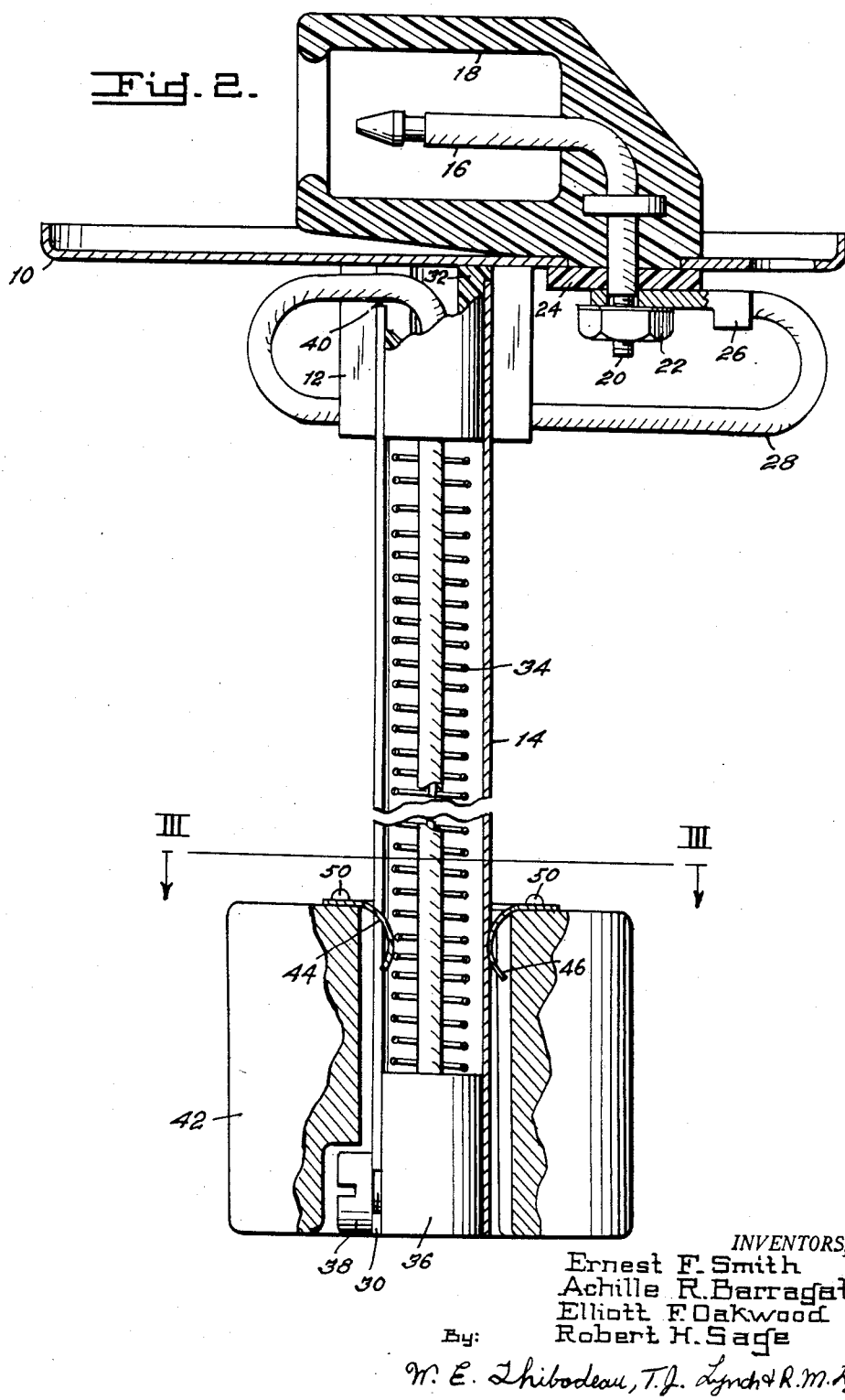

United States Patent Office 2,906,122
Patented Sept. 29, 1959

2,906,122

LIQUID LEVEL INDICATOR SENDING UNIT

Ernest F. Smith, Oak Park, Achille R. Barragato, Detroit, Elliott F. Oakwood, Birmingham, and Robert H. Sage, Detroit, Mich., assignors to the United States of America as represented by the Secretary of the Army Application January 22, 1957, Serial No. 635,551

8 Claims. (Cl. 73—313)

(Granted under Title 35, U.S. Code (1952), sec. 266)

The invention described herein may be manufactured and used by or for the United States Government for governmental purposes without the payment to us of any royalty thereon.

The invention relates to liquid level indicators, particularly to sending units of the type wherein the liquid level regulates an electric circuit operating an indicating gage.

In the interest of economy, efficiency and maintenance it is desirable to produce an electric liquid level indicator sending unit which is adaptable to a wide range of storage tank depths, yet retains the same electrical characteristics for all tanks. Such an indicator sending unit is especially desirable for gas and water tanks carried by military vehicles whereby a single construction of liquid level indicator may be used in all cars, tanks, trucks, tractors, etc., thus inventories and supply stocks would be greatly reduced and standardization will lower replacement costs.

The variable resistance liquid level indicator sending unit is dependable and accurate and is the type utilized by the invention. However, in previous constructions the length of the resistance element will vary according to the storage tank depth thereby necessitating the use of a different rated gage for each depth of tank or utilizing a voltage regulator in the gage circuit wherever a standard gage is used with all depths of tank. Since most prior constructions of electrical resistance liquid level indicators maintain a constant ratio between ohm of resistance per inch of tank depth, a lengthening or shortening of the resistance element will affect the current range output of the indicator thereby requiring the above mentioned compensating means to obtain an accurate reading.

It is thus an object of the invention to produce a liquid level indicator sending unit which may be manufactured at a standard length and be easily adapted for use with storage tanks of various depth, yet may be used with a standard gage.

Another object of the invention is to design an adjustable depth electric liquid level indicator sending unit wherein the length of the resistance element remains constant for all depths of storage tanks, yet the ohm/inch of liquid ratio will vary according to the tank depth.

These and other objects of the invention will become apparent when viewed in regard to the acompanying specification and drawings wherein:

Fig. 1 discloses a cross-sectional elevational view of the invention with the resistance element in the compressed position.

Fig. 2 is a cross-sectional elevation of the invention with the resistance element extended the full length of the guide tube.

Fig. 3 is a cross-section of the invention taken along the line III—III of Fig. 2.

The liquid level indicator sending unit of the invention may be used with all types of liquid and storage tanks and may take the form in the embodiment shown in Fig. 1.

The sending unit is adapted to project into a storage tank (not shown) and is fitted into a hole formed in the top thereof. A plate 10 comprises the supporting member of the unit and covers the hole formed in the tank top; suitable holes (not shown) are cut in plate 10 whereby said plate may be bolted to the tank.

A pair of ears 12, one of which is shown in Fig. 1, are welded to the underside of plate 10 and form the means for supporting guide tube 14, which is welded to ears 12 perpendicular to plate 10.

Electrical connection is made to the indicator through connector jack 16, which is enclosed in insulated jacket 18. Jack 16 extends through plate 10 and terminates in a threaded portion 20 on which is located threaded nut 22. An insulating washer 24 prevents jack 16 from being grounded, and a connector 26, interposed between nut 22 and washer 24, provides electrical connection from jack 16 to wire conductor 28.

The guide tube 14 is hollow and may be formed in a substantially rectangular configuration as seen in Fig. 3. One of the sides of tube 14 is left open to form a slot 30, which extends the entire length of the tube. A retainer sleeve 32, which is made of non-conducting moldable material, is fixed within tube 14 adjacent plate 10 and performs the function of supporting the resistance element, spring 34, one end of which is molded into sleeve 32. Spring 34 is preferably composed of a fine alloy wire of a given resistance per unit of length and is of sufficient coils to permit considerable elongation. The lower end of spring 34 is molded within the non-conducting bushing 36, which is also located within tube 14, and may be adjustingly positioned within tube 14 and locked in a given location by screw 38, which extends through slot 30 and threads into bushing 36.

The wire conductor 28 is made of low resistance heavy gage wire and is introduced into the top of tube 14 through a hole 40 and is fed through sleeve 32 and spring 34, wherein the insulation is stripped off and the end of conductor 28 is molded into the bushing 36 in electrical connection to the lower end of spring 34.

As seen in Fig. 3, the guide tube 14 is encompassed in part by a float 42 which may move up and down along the tube. Float 42 may be made from sheet material or may be formed of any light buoyant material such as expanded cellular cellulose acetate. A pair of brushes 44 and 46 are carried by float 42 and connected to each other by bus bar 48, which is of light sheet metal. The brushes extend toward tube 14 and are adjusted such that brush 44 projects through slot 30 and contacts spring 34 while brush 46 makes electrical connection to the tube 14. Fasteners 50 attach the brushes and bus bar to the float 42.

It will thus be apparent that current flowing from jack 16 may be transferred through conductor 28 to spring 34 and picked from spring 34 by brush 44 to be grounded to tube 14 by brush 46.

The operation of the liquid level indicator sending unit is as follows:

As the unit is manufactured, it will come from the factory, as shown in Fig. 1, with the gude tube 14 of a length long enough to permit use with a storage tank of the greatest depth contemplated. When it is desired to install the sending unit in a tank, the tank depth will be measured and the tube 14 cut off to correspond thereto; for instance, for a particular tank the tube 14 may be cut off at point A.

Once the proper tube length is obtained, the screw 38 may be unloosened and the bushing 36 moved to the end of tube 14, as shown in Fig. 2, and relocked in position. As bushing 36 is moved along tube 14, the spring 34 will be expanded, and it will be apparent that a fine, many coiled spring may be extended a considerable length without overstressing the spring; spring 34 is of sufficient length to extend to the bottom of tube 14 when of the original length. Likewise, wire conductor 28 must be of sufficient length to permit bushing 36 to be moved to the lower end of tube 14 at the original length. Upon cutting off tube 14, the conductor 28 should be shortened to prevent the excess wire between hole 40 and connector 26 from interfering with float 42. The invention is not limited to the illustrated embodiment wherein the conductor 28 is attached to the lower end of spring 34; this construction is shown as many gages require the maximum current flow to exist when the storage tank is empty. However, should the sending unit be utilized with a gage wherein maximum current flow is desired at the highest position of the float 42, the conductor 28 would be affixed to the upper end of spring 34, preferably within sleeve 32.

The sending unit is placed within the hole in the top of the storage tank, and plate 10 is affixed thereto as mentioned earlier in the specification. Float 42 will thereupon move along tube 14 and assume the liquid level.

The gage is connected to jack 16 and may be of any standard type sensitive to variations in current. Thus, as the liquid level changes, the amount of current flowing through the gage will vary according to the position of brushes 44 on spring 34 which controls the current flow to the ground, thereby indicating liquid level within the storage tank by movement of the gage.

Since the resistance element, spring 34, is merely expanded or contracted for adaption to different tank depths, the total resistance produced by spring 34 will always be the same, thereby permitting a given fixed resistance gage to be used with all depths of tanks, and, as the expansion or contraction of the spring 34 changes the distance between individual spring coils, the ratio between ohms of resistance to inches of float movement will be automatically varied according to the tank depth, thereby automatically "zeroing" the gage irrespective of tank depth.

It will thus be apparent that the invention discloses a liquid level sending unit which may be readily adapted to a wide range of storage tank depths, yet will automatically compensate for the depth to provide uniform gage deflection, thus, a single type of gage may be used with a variety of storage tank. The advantages of the above characteristics are obvious when considered with respect to military vehicles, for instance. Heretofore, all military vehicles used a standard fuel gage, and the sending unit was designed especially for each fuel tank in accordance with tank depth and gage limitations. With the design of the invention, only one construction of sending unit need be produced to fit all vehicles and the standard gage. The resultant savings in manufacturing costs, increased efficiency, and reduction in logistical problems are readily apparent.

It will be understood that various modifications may be apparent to those skilled in the art without departing from the spirit and scope of the invention:

We claim:

1. A liquid level indicator sending unit for use with a storage tank comprising, a support member affixing said unit to said tank, an expandable electrical resistance element supported by said support member, means expanding said resistance element the depth of said tank, liquid level sensing means engaging said resistance element and a conductor attached to one end of said resistance element and said sensing means whereby electric current may flow through said sending unit in proportion to the position of said sensing means.

2. A liquid level indicator sending unit comprising, in combination, a supporting member adapted to be affixed to a storage tank, a conductive guide member fixed to said supporting member adapted to be cut off to a length corresponding to the storage tank depth, a float guided by said guide member, a longitudinally expandable electric resistance element supported by said guide and insulated therefrom, interconnected electric pick-off means carried by said float and engaging said resistance element and said guide member and conductor means connected to one end of said resistance element.

3. A liquid level indicator sending unit comprising, in combination, support structure for attaching said unit to a liquid storage tank, conductive guide means carried by said support structure projecting into said tank, a float guided by said guide means, a longitudinally expandable electric resistance means carried by said support, electric pick-off means mounted on said float and cooperating with said resistance and guide means, and conductor means attached to one end of said resistance means.

4. A liquid level indicator sending unit comprising, in combination, a support member for attachment to a storage tank, a conductive guide member mounted on said support for projection into the interior of the tank, a float guided by said guide member, a longitudinally expandable electric resistance element supported by said guide member, electric pick-off means mounted on said float in engagement with said resistance element and said guide member and a conductor connected to one end of said resistance element provided with a terminal exterior of the storage tank.

5. A liquid level sending unit comprising, in combination, a support plate adapted to be affixed to a storage tank, a hollow conductive guide member mounted on said plate for projecting into the interior of the tank, a float guided by said guide member, a longitudinally expandable electric resistance member mounted within said guide member in insulated relationship thereto, interconnected brushes mounted on said float in sliding engagement with said resistance element and said guide member and a conductor connected to one end of said resistance member provided with a terminal mounted on said plate.

6. A liquid level indicator sending unit comprising, in combination, a support plate adapted to be affixed to a storage tank, a hollow conductive guide member fixed to said plate, a float guided by said guide member, an insulated sleeve fixed within said guide, a longitudinally expandable electric resistance element within said guide supported at one end by said sleeve, an insulated bushing slidably positioned within said guide and attached to the other end of said resistance element, means for locking said bushing within said guide, interconnected brushes carried by said float and engaging said resistance element and said guide and a conductor connected to one end of said resistance element provided with a terminal mounted on said plate.

7. A liquid level indicator sending unit comprising, in combination, a support plate adapted to be affixed to a storage tank, an electrical connector mounted on one side of said plate, a hollow conductive guide member fixed to the other side of said plate projecting normal thereto, a slot extending the length of said guide, an annular float encircling said guide, a non-conductive sleeve fixed within said guide, a longitudinally expandable electrical resistance element within said guide supported at one end by said sleeve, a non-conductive bushing slidably positioned within said guide, the other end of said resistance element being fixed to said bushing, means for locking said bushing within said guide, a pair of interconnected brushes mounted on said float, one of said brushes projecting through said slot in engagement with said resistance element and the other of said brushes engaging said guide, and a conductor connecting one end of said resistance element with said electrical connector.

8. In a liquid level indicator sending unit as in claim 7 wherein said resistance element comprises, a helical wound spring and means for locking said bushing comprises, a screw projecting through said slot and threaded into said bushing.

References Cited in the file of this patent

UNITED STATES PATENTS 2,282,494 Potter _____ May 12, 1942

FOREIGN PATENTS 173,071 Great Britain _____ Dec. 23, 1921
284,770 Great Britain _____ Feb. 3, 1928